United States Patent Office 3,629,457

Patented Dec. 21, 1971

1

3,629,457

FUNGICIDAL COMPOSITIONS CONTAINING 2,2'-BIS(ALLYL-CARBAMYLPHENYL)-DISULFIDE

John C. Grivas, South Holland, Ill., assignor to The Sherwin-Williams Company, Cleveland, Ohio No Drawing. Filed Feb. 17, 1969, Ser. No. 799,957
Int. Cl. A01n *9/12*
U.S. Cl. 424—324 3 Claims

ABSTRACT OF THE DISCLOSURE

Bis(allylcarbamylphenyl)-disulfide is found effective in controlling mildew fungi, especially *Pullularia pullulans* and can be incorporated in organic coating compositions. About 0.1 to 1% concentration in paint provides protection against mildew.

BACKGROUND OF THE INVENTION

Mildew attack has been a continuing problem in numerous environments where the conditions of humidity and temperature are conducive to the growth of various microbial life. Most climates provide sufficient environment for growth of fungi on organic nutrient surfaces, such as plants, fibers, and coatings. One area which has received great attention is the preventing of mildew fungus growth on exterior organic coatings, especially outside building paints. These paints are applied for protective and decorative purposes over various substrates, usually wood, metal, concrete or ceramics. Painting and repainting of wood structures in houses and other buildings consumes manpower and materials in great amounts. The blemishing and deteriorating effects of various fungi on exterior coatings result in enormous maintainance problems. Because most paints are applied by brushing or spraying a liquid coating composition onto the surface, the most common method of preventing mildew is to include in the liquid a fungicidally effective amount of chemicals which kill the fungi responsible for the mildew growth.

Numerous attempts have been made to increase the resistance of exterior coatings to mildew fungi. Inorganic compounds such as zinc oxide or leaded zinc oxide are useful for retarding mildew growth, but these components detract from moisture resistance of the films. One approach to the problem has been the controlled chalking of the film by addition of anatase titanium dioxide pigment; however, this caused more rapid erosion of the coating during weathering.

Because moisture is important to mildew growth, the chemical nature of the organic coating films significant. Many hydrophobic coatings, such as silicones, vinyls, olefins, etc., are not susceptible to mildew growth because of this. Such hydrophobic films are usually cured by heating, and are not adapted to maintainance coatings. Most air-drying paints do contain hydrophilic groups, such as carboxyl, hydroxyl, ether, or amine. These paints include the more common alkyd solvent-type, water-emulsified latex, and drying oil types.

Mildew growth on exterior organic coatings is attributed to several fungi. The relative importance of different species of fungi is climatically dependent; but, Pullularia species usually account for the major number of fungus colonies on painted surfaces in the United States. In warm, moist climates such as the Gulf areas around the 30th parallel, Pullularia species account for about 75% to over 90% of mildew growth. North of the 40th parallel this species amounts to more than half the growth. In the warmer moist areas, Alternaria species, Cladosporium species, and Penicillium species are secondary causes of discoloration. In the northern climates

2

Aspergillus species also is a secondary mildew fungus.

A number of other micro-organisms, such as Rhodotorula (yeast), Monilia, Mucor and Botrytis, are minor causes of mildew. An organic surface that is a nutrient for some fungi may not be a nutrient for others. Generally, a nutrient for other fungi will also support Pullularia growth. Alternaria occurrence is higher in latex paints, whereas Cladosporium does not thrive on a typical latex film. Rhodotorula is associated mostly with drying oil paint vehicles and areas protected from weathering (e.g., under eaves).

The preferred method for controlling mildew growth on exterior coatings is to incorporate antifungal compositions into the liquid coating material before application to the substrate. In order to achieve uniform distribution of the antifungal additives, the mixing should be performed as an industrial operation, rather than adding the fungicide in the field. For this reason chemical compatibility of the fungicide with the liquid material is important. Many fungicides lose their fungicidal activity prior to being applied in a film. This is particularly significant in latex liquid paints, which are usually alkaline. Thus, container storage life is an important criterion for selecting a paint fungicide. While small amounts of biologically active compounds may prevent deterioration of film-forming materials by anaerobic micro-organisms in a sealed can, the most important function of paint fungicides is the prevention of mildew on a nutrient surface exposed to ambient air. The weathering environment to which most exterior coatings are exposed proves to be detrimental to the biological activity of many chemical compounds.

Other chemical and physical properties to be considered for fungicide additives include animal toxicity, color, solubility (especially in water), film permeability, volatility and odor. Mercury compounds, such as phenyl mercuric phthalate, are effective against some fungi, but harmful to humans and do not prove dependable under field conditions. Dark materials, such as cuprous oxide, cannot be used in light-colored films. Many sulfur-containing compounds, for instance mercaptans, give an unpleasant or noxious odor to the coatings. Nitrogenous compounds often interfere with drying properties of oil paints. If a fungicide is too water soluble, it may be leached from the film by condensed moisture or precipitation. If the fungicide does not migrate through the coating film, it may remain buried below the paint surface and be ineffective. The mere fact that a chemical compound is known for its activity against fungi does not mean that it will be successful for inhibiting fungal growth on exterior surfaces for long periods of time.

Several organic compounds have gained acceptance as exterior paint fungicides. Captan (N-trichloromethylmercapto-4-cyclohexene-1,2-carboxamide) has been used for this purpose, and is effective against Pullularia and other fungi. Trans-1,2-bis (n-propylsulfonyl) ethylene (U.S. Pat. 3,199,990) is highly effective in alkyd and oil paints. 2,3,5,6-tetrachloro-4-(methylsulfonyl) pyridine is used in many latex paints as a fungicide.

Deterioration and discoloration of exterior films by microbial growth are discussed by Rothwell in the F.P.V.P.C. Official Digest, April 1958, pp. 368–376. Several fungi, yeast and bacteria species are known to cause mildew growth on exterior paints, but Pullularia has been reported as the major cause in over 95% of reported cases.

BRIEF SUMMARY OF THE INVENTION

High activity against Pullularia and other micro-organisms have been found using 2,2'-bis(allylcarbamylphenyl)-disulfide, a compound having the following chemical structure:

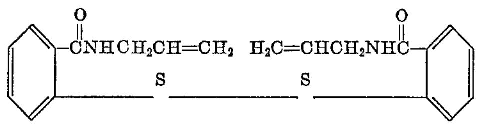

The in vitro activity of this compound against the important paint fungi is very high. In serial dilution experiments, as little as 4 parts per million concentration of the fungicidal compound inhibited fungi growth. About 0.1 to 1 wt. percent of the antifungal additive in paint gives excellent protection.

DESCRIPTION 2,2-bis(allylcarbamylphenyl) disulfide was described by Boshagen in Chemische Berichte, 99, 2566 (1966), who reported a melting point of 182° C. for the pure compound.

A preferred method for preparing the compound includes the following steps: 337.5 parts by weight of allylamine (5.9 mols) is added dropwise with stirring to a solution of 510 parts 2,2′-dithiodibenzoyl chloride (1.48 mols) in 1475 parts pyridine at 35–40° C. The solution was heated for two hours at about 100° C., cooled, and poured with stirring into 8000 parts of water at ambient temperature. The precipitated solid was filtered, washed with water and recrystallized twice from ethanol. The product, obtained in 67% theoretical yield, was 2,2′-bis-(allylcarbamylphenyl)-disulfide, having a melting point of 180–181° C.

*Analysis.*—Calcd. for $C_{20}H_{20}N_2O_2S_2$ (percent): C, 62.47; H, 5.24; N, 7.29; S, 16.68. Found (percent): C, 62.20; H, 5.24; N, 7.10; S, 16.64.

In vitro tests have established activity for the compound against common paint fungi, including *Pullularia pullulans, Cladosporium sphaerospermum,* and *Aspergillus niger.* The minimum inhibitory concentration of several compounds against Pullularia species is shown in Table I. The samples were dissolved in small quantities of ethanol or acetone, made to volume with sterile Sabouraud Liquid Medium, and tested for activity by standard serial dilution techniques. Table I shows the lowest concentration (parts per million) which inhibited the test fungi. These tests were run by incubating the sample at 25° C. for seven days.

TABLE I

Minimum inhibitory concentration (p.p.m.)

| Compound: | M.I.C. |
|---|---|
| 2,2′-bis(allylcarbamylphenyl) disulfide | 4 |
| 2,2′-bis(n-propylcarbamylphenyl) disulfide | 625 |
| Captan | 32 |
| Trans-1,2-bis(n-propylsulfonyl) ethylene | 125 |

The allyl compound was found to have 150 times greater activity than its n-propyl saturated analogue, and its activity against the important Pullularia species is far greater than commercial paint fungicides.

TROPICAL CHAMBER TESTS

A controlled laboratory test used for evaluating fungicides in dry paint films is Federal Test Method, STD No. 141, Method 6271 (May 1958). 2,2′-bis(allylcarbamylphenyl)-disulfide was tested in alkyd paint at 1% concentration and in latex paint at 0.1 to 1% concentration. These were compared to a known fungicide and latex films having no fungicide additive.

The latex paint included the following components: acrylic resin latex (Rohm and Haas AC–388, 50% solids), 410 parts; pentaerythritol phthalate resin (Aroplaz 1271), 50 parts; alkylene glycol, 70 parts; hydroxyethyl cellulose, 1 part; trialkyl phosphate plasticized, 10 parts; metal naphthenates, 2 parts; anionic surfactants and emulsifiers, 29 parts; titanium dioxide pigments 305 parts; alkaline earth silicate pigment, 150 parts; alkaline earth carbonate pigment, 45 parts; defoamer, 2 parts; ammonium hydroxide, 2 parts; and water, 169 parts. This latex paint contained about 68 percent solids.

The alkyd paint included the following components: soya oil-modified ester of glycerol and phthalic anhydride, 340 parts; linseed oil, 73 parts; chlorinated paraffin resin (Chlorowax), 91 parts; titanium dioxide pigment, 200 parts; alkaline earth silicate, 100 parts; bentonite gel, 82 parts; metal naphthenate driers, 9 parts; and mineral spirits, 130 parts. The liquid alkyd paint contained about 87 wt. percent solids.

A normal brush coat was applied to both sides of a filter paper. In a sterile environment, squares of the coated paper were laid on agar plates. The specimens were inoculated with *Pullularia pullulans* and incubated at 28° C. and 96% relative humidity. At 7, 14 and 21-day periods, they were examined and growth of fungi on the painted surface, inhibition (Z) of growth in the agar medium in a zone beyond the squares, and encroachment (E) of fungus from the agar surface over the edges of the painted surfaces were noted. These data are shown in Table II. The widths of the zone of inhibition (Z) or encroachment (E) are given in millimeters. The extent of growth on the painted filter paper is rated as none (O), light (L), moderate (M) or heavy (H). The data are shown for the ranges of three replicates for each test specimen.

TABLE II.—TROPICAL CHAMBER TESTS

| Concentration (weight-percent) | Extent of fungus growth after— 7 days | 14 days | 21 days | Encroachment (E) or Zone of inhibition (Z) after— 7 days | 14 days | 21 days |
|---|---|---|---|---|---|---|
| **Latex paint** | | | | | | |
| Control [1] | M | H | H | 2–4E | [2] | [2] |
| 1 | 0 | 0 | 0 | 5–9Z | 4–9Z | 3–9Z |
| 0.5 | 0 | 0 | 0 | 3–4Z | 3–4Z | 3–4Z |
| 0.3 | 0 | 0 | 0 | 3Z | 3Z | 2Z |
| 0.1 | 0 | 0 | 0 | 2Z | 1Z | 1Z–1E |
| **Alkyd paint** | | | | | | |
| Control | 0 | 0 | L | 0 | 3–4E | 4–6E |
| 1 | 0 | 0 | 0 | 3Z | 0–1E | 0–1E |

[1] 2,2′-bis(allylcarbamylphenyl)disulfide.
[2] Total E.

The fungicidal allyl disulfide compound may be used with a wide variety of oils, resins, solvents, pigments and coating additives in formulating organic film-forming compositions having mildew resistance. The more common types of exterior coatings for which these compounds are useful as fungicides include the drying oils, alkyds and latex-type paints. The film-forming vehicles include the triglyceride esters of unsaturated fatty acids, such as linseed oil or soya oil; esters of polycarboxylic acids with polyols, such as reaction products of phthalic anhydride with glycerol or pentaerythritol; oil-modified alkyds; modified phenolic resins, such as aldehyde condensations; melamine resins; synthetic elastomeric latexes; homopolymers or copolymers of olefinically unsaturated compounds, including vinyl acetates and acrylic resins; urethane resins; ether resins and numerous other conventional coating vehicles. Typical pigments which can be combined in exterior paints comprise titanium dioxide, alkaline earth carbonates and silicates, bentonite, mica, metal oxides, carbon, etc. Solvents and co-solvents are used conventionally in both organic-thinned or water thinned coating compositions, for instance, mineral spirits, polyols, benzenoids, etc. Numerous additives can be incorporated in the antifungal paints for suppressing foam, for plasticizing the dried films, for emulsifying latexes, or for accelerating the film cure.

While the antifungal additive is usually incorporated directly into a coating to be applied as a top coat, some organic coatings can be adequately protected by using the antifungal additive in a primer or intermediate coat.

Migration into an adjacent layer from a substrate containing a fungicide can be an effective means for controlling mildew in some applications. A relatively higher local concentration of fungicidal agent may be necessary under such conditions. Direct application of the fungicide with an inert carrier over the organic nutrient surface may be used to protect against fungus growth, but this method may not be desirable for exterior weathered surfaces due to erosion. Some interior surfaces in food processing rooms, such as bakeries, breweries, meat packing plants, etc., also suffer from mildew growth due to extreme conditions of humidity or temperature. Here the weathering effect is not such an important factor, but the use of a fungicide is desirable.

The preferred range of 2,2′-bis(allylcarbamylphenyl)-disulfide in the dry coating films is from the minimum inhibitory amount to about 2 percent by weight. Greater amounts may be used, but no particular benefit is gained from using concentrations much higher than the minimum fungicidally effective amount of these compounds.

While the invention has been described by specific examples, there is no intent to limit the inventive concept except as set forth in the following claims.

What is claimed is:

1. A mildew-resistant organic coating composition containing an organic film forming material and a fungicidally effective amount of 2,2′-bis(allylcarbamylphenyl)-disulfide.

2. The composition of claim 1 containing at least 0.1 wt. percent of 2,2′-bis(allylcarbamylphenyl)-disulfide.

3. In the method for controlling growth of *Pullalaria pullulans* on an organic nutrient surface, the improvement which comprises:

applying to the surface to be controlled a fungicidally effective composition containing 2,2′-bis(allylcarbamylphenyl)-disulfide.

References Cited

UNITED STATES PATENTS

| | | | |
|---|---|---|---|
| 2,825,676 | 3/1958 | Stevenson | 424—336 |
| 3,199,990 | 8/1965 | Taylor | 424—337 X |
| 3,256,084 | 6/1966 | Kuhle | 424—336 X |

OTHER REFERENCES

Chemical Abstracts, vol. 65, 1966, 15363f.

STANLEY J. FRIEDMAN, Primary Examiner

N. A. DREZIN, Assistant Examiner